United States Patent
Kanter (10) Patent No.: US 10,425,708 B2
(45) Date of Patent: Sep. 24, 2019

(54) LOW LOSS HIGH SPEED OPTICAL SWITCH

(71) Applicant: Gregory S. Kanter, Chicago, IL (US)

(72) Inventor: Gregory S. Kanter, Chicago, IL (US)

(73) Assignee: Nucript LLC, Evanston, IL (US)

( * ) Notice: Subject to any disclaimer, the term of this patent is extended or adjusted under 35 U.S.C. 154(b) by 1 day.

(21) Appl. No.: 15/953,626

(22) Filed: Apr. 16, 2018

(65) Prior Publication Data

US 2018/0302698 A1 Oct. 18, 2018

Related U.S. Application Data

(60) Provisional application No. 62/485,499, filed on Apr. 14, 2017.

(51) Int. Cl.
| | | |
|---|---|---|
| *H04B 10/516* | (2013.01) | |
| *H04Q 11/00* | (2006.01) | |
| *H04B 10/2507* | (2013.01) | |
| *H04B 10/70* | (2013.01) | |
| *G02F 1/313* | (2006.01) | |

(52) U.S. Cl.
CPC ....... *H04Q 11/0005* (2013.01); *G02F 1/3131* (2013.01); *G02F 1/3136* (2013.01); *H04B 10/2507* (2013.01); *H04B 10/516* (2013.01); *H04B 10/70* (2013.01); *G02F 2203/50* (2013.01); *H04Q 2011/0015* (2013.01); *H04Q 2011/0035* (2013.01); *H04Q 2011/0083* (2013.01)

(58) Field of Classification Search
CPC combination set(s) only.
See application file for complete search history.

(56) References Cited

U.S. PATENT DOCUMENTS

| 6,181,429 B1 * | 1/2001 | Barberis | G01N 21/45 356/477 |
|---|---|---|---|
| 6,456,380 B1 * | 9/2002 | Naganuma | G01J 11/00 356/450 |
| 8,265,280 B2 * | 9/2012 | Lee | H04B 10/70 380/256 |
| 2002/0057866 A1 * | 5/2002 | Hung | G02B 6/266 385/24 |
| 2002/0063947 A1 * | 5/2002 | Islam | H01S 3/06754 359/334 |

(Continued)

*Primary Examiner* — Omar S Ismail
(74) *Attorney, Agent, or Firm* — Nadya Reingand; Yan Hankin (57) ABSTRACT

A method for controlling the splitting ratio of an input optical signal to one or more output ports is described. The splitting ratio of a fiber-coupled signal in the communications band is controlled using cross phase modulation from a pump signal in the 980-1090 nm band. This design allows the nonlinear fiber in which the cross phase modulation occurs to be standard single mode fiber having a zero dispersion wavelength between 1250 and 1350 nm, such as SMF-28e fiber, which helps to maintain the lowest possible loss and a low cost while still allowing for power efficient interactions with signal wavelengths in the technologically important 1520-1610 nm band. The design is compatible with low insertion loss, narrow switching windows, and low added noise. The location of the pump pulse can be controlled allowing for the location of an input pulse to be determined.

17 Claims, 6 Drawing Sheets

(56) References Cited

U.S. PATENT DOCUMENTS

| | | | | |
|---|---|---|---|---|
| 2004/0156572 | A1* | 8/2004 | Richardson | G02F 1/3515 385/1 |
| 2009/0268276 | A1* | 10/2009 | Lee | H04B 10/70 359/330 |
| 2011/0085231 | A1* | 4/2011 | Bolshtyansky | H01S 3/06754 359/341.33 |
| 2015/0138507 | A1* | 5/2015 | Thomsen | G02F 1/35 351/221 |
| 2015/0261058 | A1* | 9/2015 | Silverstone | G02F 1/395 385/3 |

* cited by examiner

LOW LOSS HIGH SPEED OPTICAL SWITCH

CROSS-REFERENCE TO RELATED APPLICATIONS

The current patent application claims priority to U.S. provisional application No. 62/485,499 filed Apr. 14, 2017.

STATEMENT REGARDING FEDERALLY SPONSORED RESEARCH OR DEVELOPMENT

The United States Government has certain rights to this invention pursuant to contract W911QX-17-P-0015 from the US Army.

FIELD OF THE INVENTION

The field of the invention is photonic signal processing, especially switching or temporally gating low-power optical signals as may be useful in quantum information processing or measuring laser radar (lidar) return signals.

BACKGROUND

Low intensity optical signals, especially sub-photon signals or signals that maintain some unique quantum properties such as entangled photons, are sensitive to loss and added noise. Switches are commonly used as a tool to control optical signals, for instance in optical communication networks. The switch technologies tend to either be slow (e.g. 1 MHz switching) but capable of having low losses (e.g. <1.5 dB), or fast (>100 MHz) but more lossy (e.g. 3 dB). Slow switches are adequate for many purposes such as network reconfiguration, but some applications may require high speed switching or modulation. Optical amplifiers can be used to compensate for loss, but small optical signals, especially quantum signals or low-photon optical pulses that do not have a precisely known temporal location prior to measurement (such as a lidar return signal), can get swamped by the added noise of such amplifiers eliminating such amplifiers from consideration. Such signals would benefit from a low loss, low noise, and high speed switch.

One switching method that is capable of low loss, say <1 dB of insertion loss, that can also be fast and low noise is the use of cross phase modulation (XPM) in optical fiber. Such switches have been demonstrated to work for quantum signals in the 1310 nm band using pump photons in the 1550 nm band [M. Rambo, et al. "Low-loss all-optical quantum switching." Photonics Society Summer Topical Meeting Series, 2013 IEEE. IEEE, 2013]. This choice is convenient since 1550 nm is a well-developed technology because of its use in telecommunications, where 1550 nm is of special significance because it is the lowest loss wavelength in typical optical fibers. It is helpful for the pump wavelength to be longer than the signal wavelength since this reduces spontaneous Raman photon generation which is an important noise source. Furthermore, 1310 nm is still a reasonably low loss wavelength in fiber. 1550 nm and 1310 nm are separated by about 36 THz in frequency space. This large frequency separation in combination with the pump being at the longer wavelength which creates reduced Raman scattering allows the Raman scattering levels to be well controlled.

The XPM switch has been used thus far in applications where the input pulse location is known. The pump location can thus be appropriately set with respect to the incoming input pulse location. In many applications such as pulse characterization or lidar return signal evaluation the pulse location and/or its temporal profile are not known.

The XPM switch would be much more useful if it worked for signals in the technologically important wavebands from 1500-1610 nm. A straight forward design change of the previously demonstrated XPM switches would then use a ~2 μm pump laser to maintain a similar optical frequency separation between the pump and signal in order to maintain low Raman noise. This is inconvenient since 2 μm is a less well developed technology, and it is fairly lossy in Silica optical fibers thereby limiting the length of the longest nonlinear fiber that can be used. Moreover it is desirable if the pump and signal wavelengths have a similar group velocity leading to a low group velocity mismatch (GVM), that is to say that pulses at the pump and signal wavelength propagate at nearly the same velocity, and standard fibers like SMF-28e have large GVM between these two wavelengths since they are both on the same side of the zero dispersion wavelength and separated by a large wavelength difference. For a short pump pulse, a given GVM in ps/m, and a given desired switching window $\tau_{sw}$ is ps, the length of nonlinear fiber $L_{NL}$ is limited to $L_{NL} \leq \tau_{sw}/\text{GVM}$. For a given switching window a large GVM thus limits the length of nonlinear fiber. Put another way, the walk-off delay induce by GVM is $\tau_D = L_{NL} \cdot \text{GVM}$ and the switching window can be estimated as $\tau_{sw}^2 = \tau_D^2 + \tau_{pump}^2$, where $\tau_{pump}$ is the temporal duration of the pump pulse. The minimum switching window occurs when using a pump pulse much shorter than the group velocity walk-off delay in which case the switching window is the group velocity walk-off delay.

To obtain a desired π phase shift a pump power of at least $P_{pump} = \pi/(\gamma \cdot L_{NL})$ is needed, where γ is the nonlinear parameter of the fiber in units of $(W \cdot km)^{-1}$. Thus a large GVM leads to high required pump switching powers. High powers can be inconvenient, and eventually there are limitations due to for instance optical fiber fusing that prevent too much average power from being injected into the fiber.

To address the large GVM one could try to engineer a specialty fiber as the nonlinear fiber, for instance engineering the fiber to shift the zero dispersion wavelength to, say, 1750 nm which is in-between the pump and signal wavelength. Or one can engineering the fiber to have higher levels of nonlinearity. Such fibers which would likely have large splice loss to the standard fiber used for the rest of the switch components and a large splice loss to the input signal that is likely transmitted in a standard fiber. Alternatively, standard fiber could be used in the switch and a dispersive element with opposite dispersion as the standard fiber could periodically be inserted into the nonlinear fiber to 'readjust' the pulse timing between the pump and signal thus making the average GVM small (periodic dispersion compensation). This solution would also adversely impact the insertion loss of the signal, which is a critical metric especially for sub-photon quantum signals such as entangled photons.

What is needed is a low loss, high speed, low noise switch that can work near the communications wavelength band (e.g. 1550 nm) but can be built using more established technology. Ideally the nonlinear fiber should be a standard fiber for this wavelength such as the Corning SMF-28e fiber. The switch should be compatible with efficiently handling cases where the input signal arrival time is unknown. The switch can optionally be configured to have a periodic transfer function in the optical frequency of the input signal. Ideally the switch can control the splitting ratio of an input optical signal to one or more output ports, where a single output port is essentially a variable attenuator or an on/off switch. For cases with two output ports, the pump power can control the splitting ratio between the two ports, including full switching where 100% of the light exits one output port or the other, or partial switching where the input light is deterministically split between the two ports.

SUMMARY

We describe a system and method for controlling optical signals. The system is a switch that is controlled using XPM from a pump. The pump signal may be pulsed via direct modulation to improve extinction ratio or eliminate the need for a pump external modulator. The pump pulse is in the technologically friendly 980-1090 nm band, typically near 1064 nm. This choice allows the nonlinear fiber to be standard single mode fiber having a zero dispersion wavelength between the pump and signal wavelength, typically between 1250 and 1380 nm, including standard fiber such as SMF-28e fiber, which helps to maintain the lowest possible loss and a low cost while still allowing for power efficient interactions with signal wavelengths in the technologically important 1500-1610 nm bands. The fiber may support multiple spatial modes at the pump wavelength, but the pump is injected so as to excite primarily the fundamental spatial mode. The choice of pump wavelength is convenient as there are many useful components available in this wavelength band such as high quality optical amplifiers. The design is compatible with low insertion loss, narrow switching windows, and low added noise.

Although the pump is at a shorter wavelength than the signal, a condition that leads to increased undesirable Raman scattering, the optical frequency separation between the pump and signal are >75 THz apart thus keeping Raman noise reasonably small even for single-photon input signals. For instance, the net Raman generated noise can be <$10^{-3}$ noise photons/pump pulse allowing high signal-to-noise ratios even with sub-photon input signals.

The switch is formed in an interferometer. If the interferometer paths are physically separated (i.e. not configured in a Sagnac Loop) then the internal interferometer phase may need to be actively stabilized. A locking wavelength signal of a different wavelength than the signal wavelength is used to lock (stabilize to a desired setting) the interferometer phase (phase difference between arms of the interferometer). This is done by setting the internal phase at the locking wavelength appropriately via a feedback scheme (using a locking method that can lock to any desired internal phase, e.g. Freschi, A A and Frejlich, J. 1995. *Opt. Lett.*, 20: 635-637), typically such that the interferometer phase at the signal wavelength is a value of 0 or $\pi$. This configuration where the locking wavelength and the signal wavelength do not need to have the same interferometer phase puts less of a constraint on a relationship between the locking wavelength and a signal wavelength and especially constraints on operation when the interferometer is asymmetric such that the delay difference between the two arms of the interferometer $\delta\tau$ is not zero and thus the interferometer transfer function (or equivalently the interferometer phase) is a function of optical frequency (or equivalently optical wavelength). The locking wavelength signal can be made to back-propagate through the interferometer in the opposite direction as the signal and pump in order to reduce cross-talk from the locking wavelength into the interferometer output and to decouple the pump XPM from the measurement of the interferometer phase (XPM in the backward direction is minimal). Locking to a locking wavelength also enables the interferometer to stay locked even when the signal is not present for long periods of time, which may for instance occur in lidar applications.

The pump power can be adjusted to alter the splitting ratio between a signal at an input port and one or more output ports. For the case of a single output port altering the splitting ratio is equivalent to altering the transmission loss through the switch. The splitting ratio is dependent on the sum of the internal phase of the interferometer and the XPM induced phase shift, thus since the XPM induced phase shift is pump power dependent the splitting ratio can be controlled via the pump power.

The system can measure signal pulse trains that arrive at unknown times in a fast and efficient manner. This is accomplished by measuring the signal pulse location first with coarse resolution, then with fine resolution using narrow temporal gates allowed by using short pump pulses in the XPM optical switch. After the coarse measurement the fine measurement can be performed over a more limited temporal range thus making it more efficient. Information from the fine measurement is used to configure the pump pulse location using a pump generator which can control the temporal pump pulses on a fine temporal resolution to subsequently control the switch's temporal gate of the signal. Typically the signal will be measured with a sensitive photodetector, including the use of a single photon detector (SPD). The initial coarse resolution measurement can use the inherent temporal resolution of the SPD $\tau_{SPD}$. The fine resolution measurement should have substantially finer temporal resolution such as <$0.2\cdot\tau_{SPD}$, where the fine resolution is obtained by choosing pump pulse widths and controlling the relative temporal location between the pump and signal pulses on a temporal scale <$0.2\cdot\tau_{SPD}$.

The process of measuring a coarse and fine resolution can be implemented by various means, such as initially using a temporally wider pump pulse to coarsely find the signal temporal location. Once the signal pulse location is coarsely determined, then a narrower pump pulse is configured to scan the coarsely determined temporal location to measure the signal location and/or signal pulse shape with higher resolution.

Scanning the relative location of the pump pulse train with respect to the signal pulse train allows the temporal localization of the signal pulse train, and such a scanning can be accomplished by a setting the repetition rate of the pump pulse train so that $f_{pulse}=(m_1/m_2)f_{pump}$, where $m_1$ and $m_2$ are integers, $f_{pulse}$ is the signal pulse repetition frequency, and $f_{pump}$ is the pump repetition frequency. If the switching window is shorter than the input signal pulse-width then it is also possible to measure the input signal pulse shape by scanning the pump pulse train with respect to the signal pulse train.

An alternate implementation could use just one detector, first without a pump to coarsely determine the pulse location using the timing resolution of the detector itself, and then using narrow pump pulses to time-gate the detector on a finer temporal grid. In this case, the internal phase of the interferometer can be shifted between the coarse and fine measurement such that the same detector measures the signal when the pump is not present for the coarse measurement and when the pump pulse is present during the fine measurement.

DETAILED DESCRIPTION

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not to other embodiments. In general, features described in one embodiment might be suitable for use in other embodiments as would be apparent to those skilled in the art.

Figure 1:
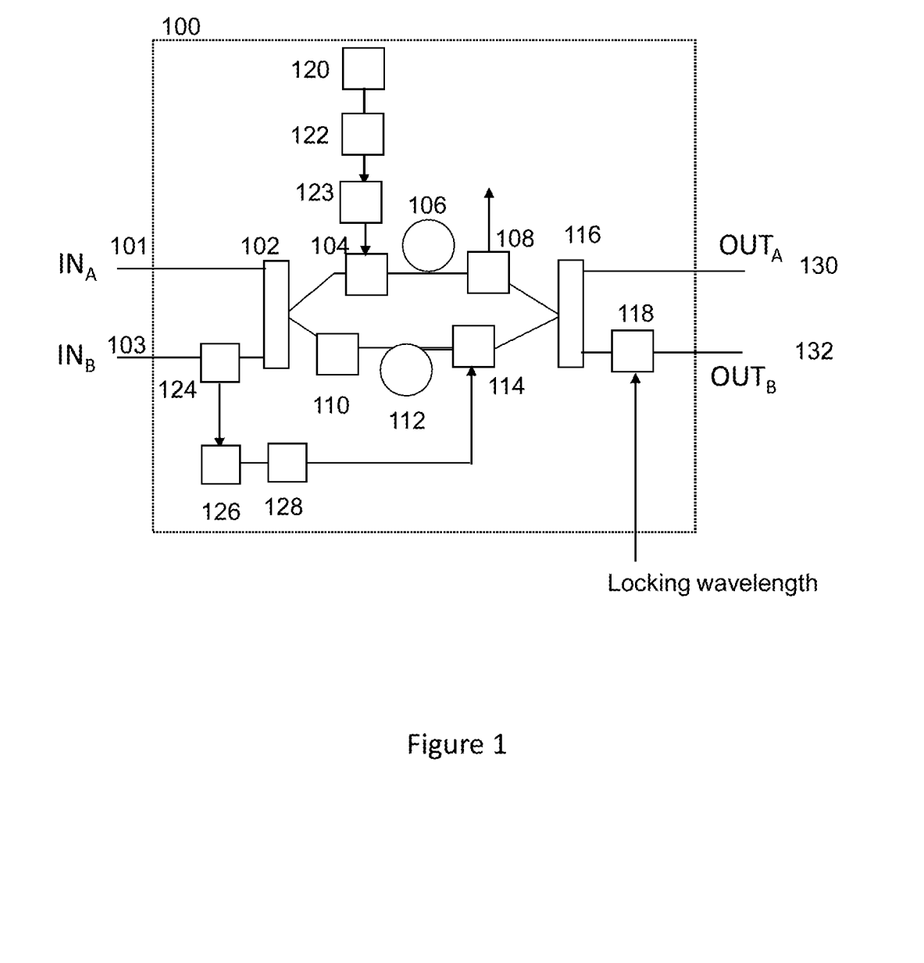
FIG. 1: MZI embodiment of the XPM optical switch.

An embodiment of the invention is shown in FIG. 1. The XPM optical switch [100] is formed in an interferometer, which in this embodiment is a Mach-Zehnder interferometer (MZI). A first 50/50 optical coupler [102] splits an input signal, which can come from either input port $IN_A$ [101] or $IN_B$ [103] or some combination thereof, into two arms. One arm has a wavelength division multiplexer (WDM) [104] that combines a pump laser [120] modulated by a pump modulator [122] with the signal. Alternatively the pump laser may be modulated directly using current modulation, or multiple modulation methods can be cascaded. The modulated pump can be amplified if necessary in an optical amplifier [123] to obtain the required switching power to induce via XPM a nearly π phase shift in the interferometer, which is the typical switching configuration. Other phase shift values can also be selected by adjusting the power of the pump pulse. The utility of directly modulating the pump laser can be for eliminating the need for an external modulator or for enhancing the extinction ratio of the pump pulses before the optical amplifier in order to generate high peak powers from an average-power limited optical amplifier. If the pump laser is a semiconductor laser then directly modulating the laser can mean modulating the current driving the semiconductor laser. Changing the laser current can also have an effect on the laser optical frequency, for instance shifting it by ~100 MHz/mA or potentially many GHz overall. However, this amount of optical frequency shift is inconsequential for the invention since the separation between the pump and signal optical frequencies is many orders of magnitude greater (>75 THz).

The signal and pump co-propagate through a nonlinear fiber [106] that induces the XPM. The nonlinear fiber is composed of a fiber that has a single spatial mode at the signal wavelength, which is in the 1500-1610 nm band. The fiber has a zero dispersion wavelength between the pump and signal wavelength, and typically between 1250-1380 nm. All the fibers that the signal passes through are of a similar fiber type with similar mode size so they can be spliced or connected together with low loss. The nonlinear fiber can have multiple spatial modes at the pump wavelength, which is in the range of 980-1100 nm. This fiber will henceforth be called standard fiber, which could be for example Corning SMF-28e or similar fiber. Such a fiber has low waveguide dispersion keeping the zero dispersion of the fiber in the desired range. The pump light that is coupled into the standard fiber is coupled so that it primarily excites the fundamental mode of the standard fiber at the pump wavelength. In so doing the standard fiber behaves almost as if as it was single moded at the pump wavelength, provided the fiber does not couple the fundamental pump spatial mode to the higher order pump spatial modes which is typically true for the short (e.g. 1 km) fiber lengths of interest. These choices of parameters allow for a power-efficient nonlinear interaction with low loss in optical fibers. A second WDM [108] removes the pump light after the nonlinear interaction.

The other interferometer arm consists of a fiber polarization controller [110], a second length of fiber [112] to set the differential path length between the two arms of the interferometer to a desired temporal delay difference value of $\delta\tau$ where in this case $\delta\tau=0$ which indicates a broad band switch. The frequency transfer function of the switch has a periodicity of $1/\delta\tau$ and thus the frequency transfer function of the switch is flat (infinite frequency periodicity) when $\delta\tau=0$. For instance, if the two paths are matched to within 1 ps then the frequency transfer function has a periodicity of about 1,000 GHz and thus input optical frequencies separated by <100 GHz will have similar transfer functions. The MZI also contains a phase shifter [114] to control the splitting ratio of the switch when the pump is not present. The signal in both interferometer arms are combined in an output 50/50 coupler [116] creating two output ports. Other output couplers such as a 2×1 coupler that would create a single output port could also be used.

A locking signal at a locking wavelength that is sufficiently different from the signal so as to be easily spectrally filtered (e.g. >0.8 nm away) is injected into a low-tap coupler [118] such as a 95/5 splitting ratio coupler that will have very little loss at the signal wavelength but higher loss at the locking wavelength. A wavelength division multiplexer (WDM) coupler could also be used which would preserve more of the locking wavelength power but would likely have more insertion loss for the signal. The locking wavelength propagates backwards through the interferometer and a portion is tapped off in a second low-tap coupler [124], then measured in an optical-to-electrical converter [126] that is fed to phase feedback electronics [128] that generates a feedback signal to send to the phase shifter to phase-lock the interferometer. The phase difference between the two arms of the interferometer at the locking wavelength can be set to any desired value over the full range of 0-360°. Typically a dither is applied on either the phase shifter [114] or if the interferometer arm path-lengths are imbalanced ($\delta\tau\neq0$) a dither can be applied to the wavelength of the locking signal so that the internal phase of the interferometer can be measured and locked. The locking signal does not have to propagate backwards through the interferometer, but doing so can reduce leakage issues from the locking signal into the output ports and helps to decouple the measurement of the inherent interferometer phase from the pump since the pump and locking wavelength do not efficiently interact in this direction.

The ability to stabilize the interferometer phase at the locking signal to any value allows the performance of the switch at the signal wavelength to be controlled without placing many constraints on the wavelength difference between the signal wavelength and locking wavelength. The signal and locking wavelength both need to be suitably stable, say each having a total variation in optical frequency of $\delta f < (1/20)\cdot(1/\delta\tau)$, but the exact wavelength separation of the two lasers can be chosen over a wide range. This allows more choice in the locking wavelength, which could for instance be stabilized to some known but fixed wavelength using a gas cell like Acetylene. Locking the interferometer using a locking wavelength signal is more robust than trying to use the potentially low power input signal which in some cases can have less than one photon per pulse or per switching window and in some cases may have no photons for an extended period of time.

The invention could also be realized in a Sagnac loop which has a stable phase relationship between the two interferometer paths which are now realized as two propagation directions around a loop, as is known in the art. Such a design is incorporated into the invention. The benefit of the Sagnac loop is its phase stability thus negating the need for a locking method. A drawback is that to have two output ports a circulator is required which increases the insertion loss of the device. The Sagnac loop is a good design choice when only one output port is required.

The switching window $\tau_{SW}$ generated by a pump pulse is determined both by the pump pulse duration $\tau_{pump}$ and the group velocity mismatch (GVM) between the pump and signal in the nonlinear fiber, which can be specified as a walk-off delay time of $\tau_d$. Roughly speaking we can estimate the gated switching window as $\tau_{SW} \sim (\tau_{pump}^2 + \tau_d^2)^{0.5}$.

The interferometer has two outputs $Out_A$ [130] and $Out_B$ [132]. The presence of a pump pulse shifts the mapping of the input ports to the output ports. For example, if no pump is present then a signal sent to $IN_A$ exits $OUT_A$ and a signal sent to $IN_B$ exits $OUT_B$, while if a pump is present that generates a $\pi$ XPM phase shift then the outputs are switched so that a signal entering $IN_A$ exits $OUT_B$ and a signal sent to $IN_B$ exits $OUT_A$. The mapping from $IN_A$ and $IN_B$ to the outputs can be written as $OUT_A = IN_A \cdot Cos^2(\phi+\phi_p) + IN_B \cdot Sin^2(\phi+\phi_p)$ and $OUT_B = IN_A \cdot Sin^2(\phi+\phi_p) + IN_B \cdot Cos^2(\phi+\phi_p)$, where $\phi$ is the internal phase difference between the interferometer paths at the signal wavelength and $\phi_p$ is the XPM phase shift applied by the pump pulse (when present). Typically $\phi=0$ or $\pi$ and $\phi_p=\pi$, which is the switching function where the output port that either input port is sent to depends on if the pump is or is not injected into the switch.

Figure 2:
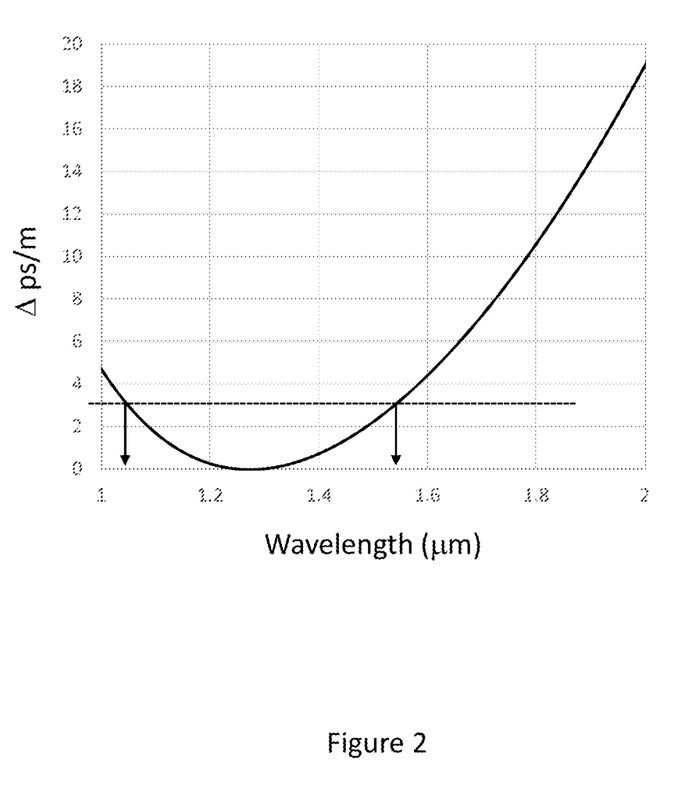
FIG. 2: Relative walk-off in ps/m for pure Silica, showing pulses at wavelength near 1050 nm and 1540 nm will propagate at about the same speed while 2 μm and 1540 nm pulses will walk-off by >10 ps/m.

FIG. 2 shows the group velocity walk-off with respect to the zero dispersion wavelength of Silica as a function of wavelength. This curve is modified when propagating through a fiber due to waveguide dispersion that depending on the fiber dopants, material, and dimensions. We use it here as an approximation for standard single mode fiber, which has fairly small waveguide dispersion. A wavelength at 1300 nm is about the zero dispersion wavelength. Operating with a pump and signal near 1550 nm and 1300 nm leads to a difference of about 3 ps/m walkoff. Operating with a pump and signal near 1900 nm and 1550 nm (a similar optical frequency difference) would lead to >10 ps/m of walk-off, which is a large value will negatively impact either the minimum switching window or the length of nonlinear fiber (thus in turn the required pump power). Choosing wavelengths of 1050 nm and 1540 nm leads to nearly identical group velocity walk-off (0.1 ps/m) thus allowing for much longer nonlinear fiber lengths. The invention can keep the walk-off between the pump and signal wavelengths to <5 ps/m which is substantially better than an alternative method of pumping at >1850 nm.

Figure 3:
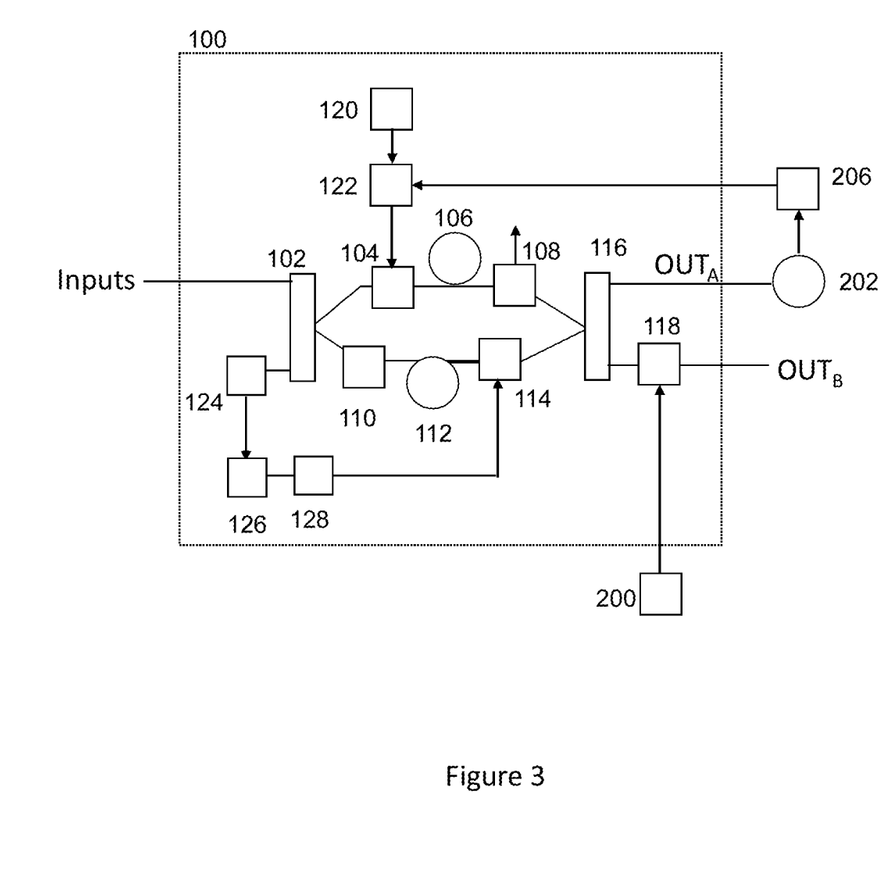
FIG. 3: similar to FIG. 1 but information from the SPD detector [202] is used to help set the pump pulse location through a feedback loop.

FIG. 3 shows an implementation of the switch that allows for the detection of an input signal that is a train of pulses at a fixed pulse rate but at an unknown pulse location. Many components of FIG. 3 are identical to FIG. 1 and are labeled the same. The system has a feedback loop that uses the electrical output from an output optical detector [202], which we assume here is a single photon detector (SPD), to control characteristics of the pump. The electrical output from the SPD is sent to gate feedback electronics [206] which can control the temporal characteristics of the pump pulse train such as its temporal location and temporal width. In this embodiment the pump pulse location is controlled by a signal sent from the gate feedback electronics to the pump modulator [122]. Here the pump modulator is a generic term for the ability to modulate the power of the pump as a function of time forming a pump pulse and controlling the temporal location of the pump pulse. The pump modulator could be realized as a sequence of devices such as the combination of a modulator and programmable optical delay lines, where the programmable optical delay line can contain a sequence of optical switches that sends the pump pulses through some chosen sequence of fixed optical delays. A locking laser [200] is used to generate the locking wavelength signal to lock the interferometer phase as desired.

For the purposes of an example, assume the SPD has a temporal resolution of 200 ps and requires a dead-time of 10 µs. Also assume for now that we know the input signal pulse period is $T_{rep}$, but do not know the arrival time of the pulse train of low-photon signal pulses. A first course measurement of the signal pulse train arrival time can be made by turning the pump off (or if the pump pulse duty cycle is low enough one can even leave it on as it will have minimal effect since the short pump pulse is unlikely to arrive at exactly the same time as the signal). The switch interferometer phase is configured so that the input signal when the pump pulse is off goes to $OUT_A$ which is detected by the output optical detector [202]. After a photon is detected its arrival time is now known to a precision of about the detector temporal resolution $\tau_{det}$ or about 200 ps. This time interval over which the system knows that the incoming pulse is localized to can be called the coarse arrival time $\tau_{coarse}$, which could be reduced by averaging M such single photon detections to a value of $\tau_{coarse} \sim \tau_{det}/\sqrt{M}$. In other words, detecting many pulses can help to reduce the temporal arrival time uncertainty. The invention aims to improve the ability to measure the temporal arrival time of the pulses over simply measuring multiple pulse arrival times with the SPD.

Figure 4:
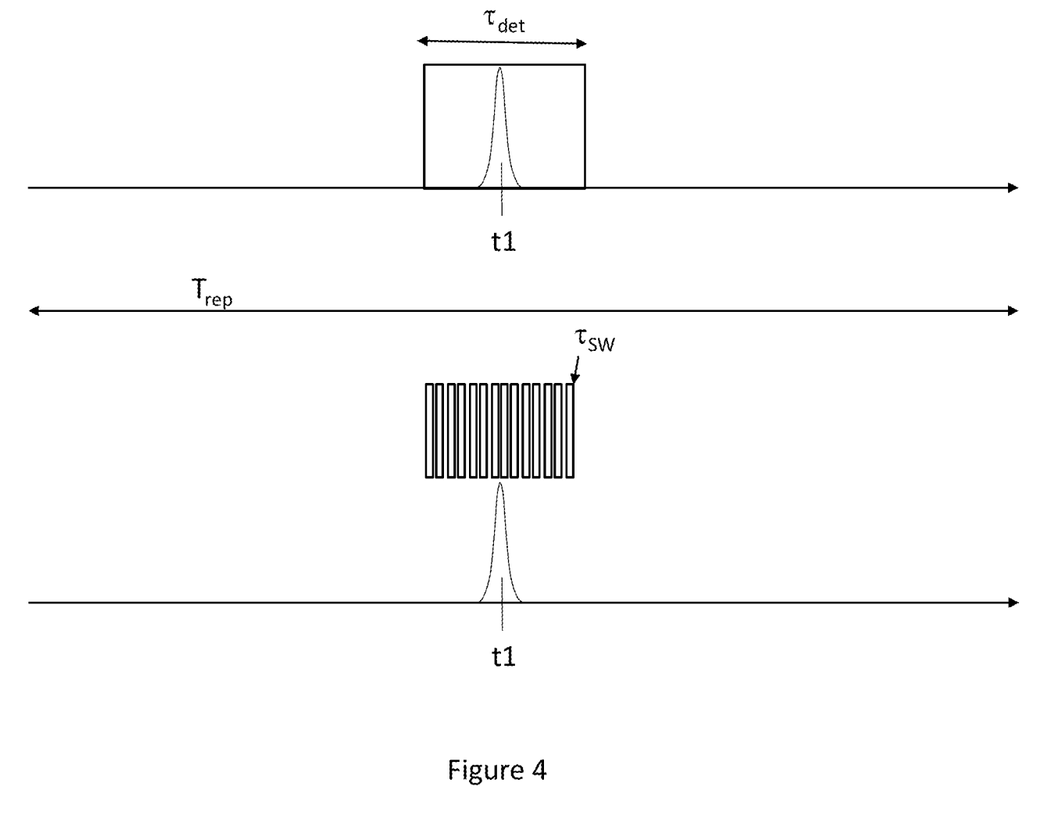
FIG. 4: Diagram of method to localize the pulse arrival time. Initially the SPD localizes the pulse to a time of $\tau_{det}$. Then a series of gate pulses are applied over the $\tau_{det}$ interval to localize the pulse arrival time to a finer resolution.

The switch phase is now configured so that the signal only hits the optical output detector when the pump is on (by adding an additional $\pi$ internal phase shift). The gate feedback electronics configures the pump temporal duration (thus also the switching gate $\tau_{sw}$ if $\tau_d \ll \tau_{pump}$, which is assumed here) so that $\tau_{sw} < 0.2 \cdot \tau_{coarse}$, say in this case $\tau_{sw}$ is 100 times smaller than $\tau_{coarse}$ or $\tau_{sw} = 200$ ps/100=2 ps. The gate feedback electronics scans the pump location in fine increments smaller or approximately the same as $\tau_{sw}$ or in this case about 2 ps steps over the coarse arrival time. In so doing 100 steps are used to finely scan the pulse location with 2 ps duration (resolution) over $\tau_{coarse}$. The use of different coarse and fine temporal measurements is depicted in FIG. 4, where the SPD initially determines the pulse location to a time window of $\tau_{det}$, and later a series of time gates is used to localize the pulse to a time window of $\tau_{sw}$. If there is a 20% chance of detecting the pulse with the SPD when the gate is overlapped temporally with the incoming optical pulse, then the correct gate location can be determined if each gate pulse is applied, say, for 20 optical pulses (leading to on average 4 single photon detections). The total number of optical pulses required to localize the pulse is thus ~20 to detect it initially with the SPD, then 20·100 to localize it to the 2 ps window, or ~2,000 pulses total.

Figure 5:
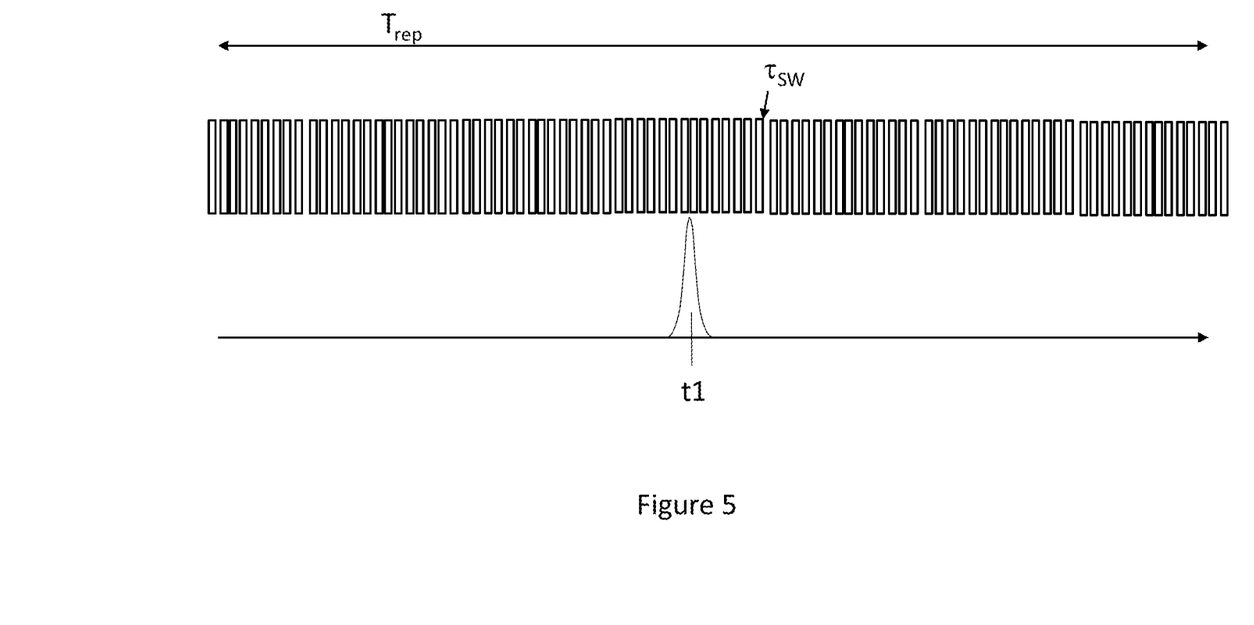
FIG. 5: Less efficient alternative to FIG. 3 where the gate location is scanned over the entire pulse repetition rate.

As an example of the utility of this method, assume that $T_{rep}=20$ ns. To scan this entire duration in 2 ps steps would require 10,000 steps or when averaging over 20 pulses per step 200,000 pulses. This brute force scanning method that does not employ both a course and a fine resolution would also localize the pulse location to 2 ps. A simplified diagram of a scheme that scans the fine gate time over the entire repetition rate is shown in FIG. 5. This is clearly much less efficient than the method of FIG. 4.

Another way to try to measure the incoming signal pulse location to 2 ps resolution would be to use count averaging. This would require $M \sim 100^2 = 10,000$ counts. Given the 20% probability of detecting a pulse this is about 50,000 optical pulses. However, by using the course and fine capability of the invention we only need a small number of counts (say 1 or 2) to initially localize the pulse to 200 ps, then about 100 steps to find the pulse to 2 ps resolution. This is much more efficient, especially if the detector dead time is large which necessitates that a large number of counts will take a correspondingly large amount of time. In this case the time to localize the pulse can be reduced by a factor of 50,000/2,000=25× by using the invention as described.

Note that by scanning the location of $\tau_{sw}$ we can also measure the incoming pulse shape, even when the pulse duration is much smaller than the detector temporal resolution $\tau_{det}$. This is because the effective temporal resolution of the detection is now set by $\tau_{sw}$ which can be designed to be much smaller than $\tau_{det}$. If we define a pulse to be well characterized if its temporal width is 5 or more times the measurement temporal resolution then the detector alone can measure the shape of ~1 ns pulses but by using the switch with the aforementioned parameters a pulse resolution of ~10 ps is possible.

The use of a coarse and fine temporal detection time can be embodied in many ways, including widening the pump pulse duration to have a first longer gate width (switching window) that spans a given fraction of the repetition period to initially determine the input signal pulse position to a coarse resolution, followed by then using a shorter pump pulse and thus a shorter gate width of a duration that is a fraction of the course resolution.

It is possible to use detectors with different characteristics on both output ports of the switch and use the switch to control which detector is used at any given time. We note that in many cases one will want to optimize the pump temporal position to optimally operate on the signal pulses by overlapping them in time at the nonlinear fiber. The coarse and fine temporal detection technique can be used to determine the optimal pump pulse location in an efficient way.

The ability to measure pulse shape can also be implemented by using a pump pulse repetition rate that is different from the signal pulse repetition rate. This effectively scans the pump pulse location with respect to the signal pulse location. The invention would allow such a measurement for very low power signals because of the low noise interaction that is embodied by the wavelength choices previously noted. Other methods of optical sampling like the use of four-wave mixing gain will work for macroscopic signals but are too noisy for very small signals especially signals that have less than or about one photon per pulse.

As an example, if the incoming pulse has a period of $T_{period}=1$ ns($f_{signal}=1$ GHz), and the pump pulse has a period of $(n/m) \cdot T_{period}$, where n and m are integers then the relative location of the pump and signal pulses will shift in a predictable way scanning the pump location over the repetition period. Setting n=99 and m=100 would mean the pump pulse is shifted by 1% of 1 ns or 10 ps with respect to the signal pulse subsequent period, with the pattern repeating every 100 periods. Creating a count histogram of the total singles count in every relative pump-to-signal temporal location will produce a measured signal pulse shape with 10 ps resolution.

Figure 6:
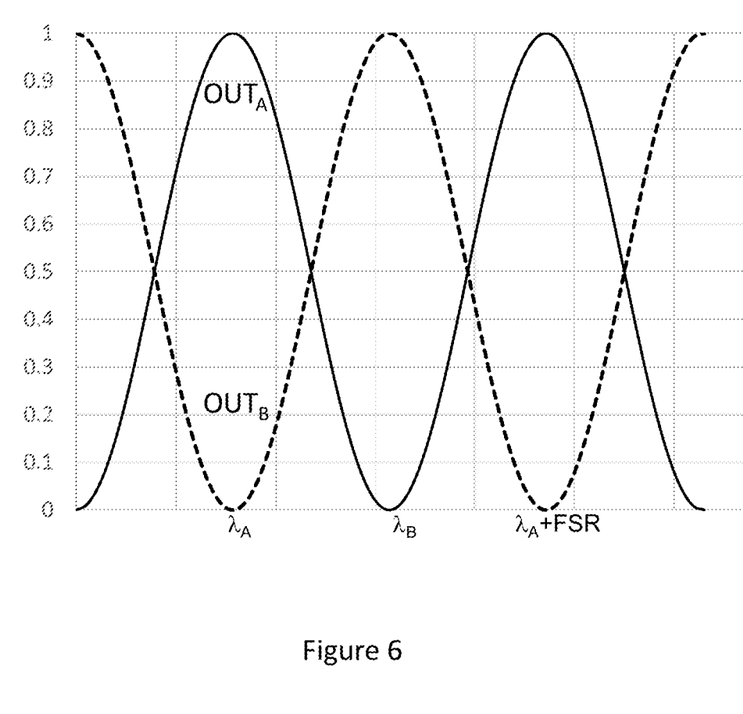
FIG. 6: Normalized output power as a function of optical wavelength (or optical frequency) when $\delta\tau \neq 0$ assuming no pump input. Power is periodic over a free spectral range (FSR). The presence of a pump can switch the A and B output ports so that $\lambda_A$ exits $OUT_A$ with no pump and $\lambda_A$ exits $OUT_B$ with a pump (vice versa for $\lambda_B$).

The switch can be configured to operate as both a temporal and frequency domain switch by choosing $\delta\tau \neq 0$. A transfer function of the switch outputs as a function of wavelength is shown in FIG. 6 assuming no pump. If the pump is off then the signal will exit port $OUT_A$ when it is at wavelength $\lambda_A$, (or $\lambda_A + N \cdot FSR$ where FSR is the free spectral range in wavelength units and N is an integer) and $OUT_B$ when it is at wavelength $\lambda_B$. The signal power out of port A is indicated by the solid line and the signal power out of port B is indicated by the dashed line in FIG. 6. However, the presence of pump pulse that induces a π XPM phase shift will switch the wavelengths so that the signal will exit port $OUT_A$ when it is at wavelength $\lambda_B$, and $OUT_A$ when it is at wavelength $\lambda_B$. That is the presence of the pump will switch the $OUT_A$ and $OUT_B$ wavelength transfer functions. This performs a wavelength and temporal switching function that is enabled by the ability of a MZI or similar interferometer to have asymmetric arm lengths, or $\delta\tau \neq 0$. This asymmetric configuration is further enabled by the locking scheme which allows the interferometer to be set to any desired phase at the locking wavelength. This configuration can be used for instance to switch a sequence of evenly spaced wavelengths (an optical comb), to separate the comb into even and the odd comb lines where the even lines and the odd lines are sent to different output ports depending on the presence or absence of a pump pulse. It can also be used to control the basis state measurement of a quantum key distribution receiver.

Foregoing described embodiments of the invention are provided as illustrations and descriptions. They are not intended to limit the invention to precise form described. In particular, it is contemplated that functional implementation of invention described herein may be implemented equivalently in other available functional components or building blocks. Other variations and embodiments are possible in light of above teachings, and it is thus intended that the scope of invention not be limited by this.

What is claimed is:

1. An apparatus for an optical switch that controls a splitting ratio of an input optical signal containing less than one photon per switching window to one or more output ports, comprising:
an interferometer constructed with an optical fiber;
the input optical signal being split into a first and a second paths having a relative temporal delay of $\delta\tau$, including $\delta\tau=0$, the first path comprising a combiner to combine the input optical signal having a wavelength $\lambda_s$ with an optical pump having a wavelength $\lambda_p$, and a first length of fiber where a presence of the pump induces a cross phase modulation (XPM) phase shift on the signal; the second path containing a second length of fiber to set $\delta\tau$; the optical signals from the first and second interferometer paths interfering to form one or more output ports, where an inject pump power controls a power splitting ratio between the input signal and each of the two output ports; $\lambda_s$ being in a wavelength range from 1500-1610 nm, $\lambda_p$ being in a wavelength range from 980-1090 nm, and the first length of fiber having a zero dispersion wavelength that is between $\lambda_s$ and $\lambda_p$, a minimum temporal switching window being equal to a group velocity walk-off between the pump and signal wavelengths;
specified design parameters allowing for low group velocity walk-off between the pump and signal thereby enabling pump power-efficient switching, and simultaneously allowing for a large optical frequency spacing between the pump and signal of >75 THz to reduce unwanted background noise photons generated from spontaneous Raman photon scattering to <$10^{-3}$ photons per switching window.

2. The apparatus of claim 1, wherein the first length of fiber has a single spatial mode at $\lambda_s$ and multiple spatial modes at $\lambda_p$, and where the pump is launched into the fiber so as to primarily excite a fundamental pump spatial mode thereby mitigating an impact of higher order pump modes.

3. The apparatus of claim 1, wherein the first and second paths are physically separate, and the relative phase delay between the first and second paths is controlled by injecting a locking wavelength signal into the interferometer, the locking wavelength being different from the signal wavelength, detecting the locking wavelength signal with an optical-to-electrical detector, processing the detected locking wavelength signal to generate a feedback signal, and sending the feedback signal to a phase-shifter located in one of the interferometer paths so as to keep the interferometer splitting ratio constant when the pump is not present.

4. The apparatus of claim 3, wherein the locking wavelength signal propagates in the interferometer paths in an opposite direction as the input signal, thereby reducing a leakage from the locking wavelength signal to the output ports and decoupling cross-phase modulation (XPM) from a interferometer phase measurement.

5. The apparatus of claim 1, wherein the optical pump is modulated by directly modulating a laser that generates the optical pump signal.

6. The apparatus of claim 1, wherein the interferometer is a Sagnac loop and the interferometer paths correspond to different propagation directions around the Sagnac loop.

7. The apparatus of claim 1, where the input signal is a series of input optical pulses forming a pulse train that arrives at a repetition frequency $f_{pulse}$, a single photon detector (SPD) detects a temporal location of the signal pulses to a coarse temporal resolution $\tau_{SPD}$ determined by the SPD, and a pulse arrival time is determined with a fine resolution <$\tau_{SPD}$ by varying the temporal location of a pump pulse using a timing control apparatus with a temporal control resolution of <$0.2 \cdot \tau_{SPD}$ thereby allowing for determining the arrival time of the incoming pulse train with enhanced temporal resolution.

8. The apparatus of claim 1, wherein the input signal is a pulse train that arrives at a repetition frequency $f_{pulse}$, and the pump is a pulse train that arrives at a repetition frequency $f_{pump}$, and whereas $f_{pulse}=(m_1/m_2) \cdot f_{pump}$ where $m_1$ and $m_2$ are integers, a pump pulse arrival time thus scanning its location with respect to a signal pulse arrival time throughout a period of the signal pulse train thereby allowing the arrival time of the signal pulse train to be located.

9. The apparatus of claim 1, wherein the pump is a pulse train and a pump pulse width is controlled by a pump pulse generator, the pump pulse generator selecting the pump pulse width in order to control the switching window, with a wider switching window enabling an arrival time of the input signal being an input pulse train to be determined over a coarse temporal window, followed by selecting a shorter switching window scanned over the coarse temporal window enabling the arrival time of the input pulse train to be determined with higher resolution.

10. An apparatus for an optical switch that controls a splitting ratio of an input optical signal to one or more output ports, comprising:
an interferometer constructed with an optical fiber; the input optical signal being split into a first and a second paths having a relative temporal delay of $\delta\tau$, including $\delta\tau=0$, the first path comprising a combiner to combine the input optical signal having a wavelength $\lambda_s$ with an optical pump having a wavelength $\lambda_p$, and a first length of fiber where a presence of the pump induces a cross phase modulation (XPM) phase shift on the signal; the second path containing a second length of fiber to set $\delta\tau$; the optical signals from the first and second interferometer paths interfering to form one or more output ports, where an inject pump power controls a power splitting ratio between the input signal and each of the two output ports; $\lambda_s$ being in a wavelength range from 1500-1610 nm, $\lambda_p$ being in a wavelength range from 980-1090 nm, and the first length of fiber having a zero dispersion wavelength that is between $\lambda_s$ and $\lambda_p$, a minimum temporal switching window being equal to a group velocity walk-off between the pump and signal wavelengths; specified design parameters allowing for low group velocity walk-off between the pump and signal thereby enabling pump power-efficient switching, and simultaneously allowing for a large optical frequency spacing between the pump and signal of >75 THz to reduce unwanted background noise photons from spontaneous Raman photon scattering; wherein the pump is a pulse and a pump power of a pump pulse is controlled by a pump pulse generator, the pump power selecting the amount of XPM phase shift $\phi_{XPM}$, whereas a linear phase difference between the two paths of the interferometer is $\phi_{path}$, whereas the splitting ratio of the input signal to the a first output ports is $\cos^2(\phi_{path}+\phi_{XPM})$ and the splitting ratio of the input signal to a second output port is $\sin^2(\phi_{path}+\phi_{XPM})$, thereby allowing the pump power to control the splitting ratio to any desired point.

11. A method for dynamic control of a splitting ratio from an input optical signal to one or more output ports, comprising: splitting the input optical signal into two interferometer paths, imparting a phase shift on one path using cross phase modulation (XPM) from an optical pump signal, and interfering the optical signal in the two paths; using optical fiber as a nonlinear medium that generates XPM and whereas the optical fiber is designed to have a zero-dispersion wavelength in-between the pump and signal wavelengths, the signal being of a wavelength in a communications band from 1500-1610 nm and the pump signal being of a wavelength between 980-1090 nm thus having an optical frequency >75 THz away from a signal optical frequency thereby inhibiting unwanted Raman photon scattering and enabling operation with low intensity input optical signals; further comprising injecting a locking wavelength signal into the interferometer, measuring an intensity of the locking wavelength signal exiting the interferometer to measure the phase shift between the two interferometer paths, stabilizing an interferometer phase by applying a feedback phase correction to one of the interferometer paths, thus allowing the interferometer to stay locked even when the input optical signal is not present.

12. The method of claim 11, further comprising injecting the optical pump into a fundamental mode of the fiber thereby reducing a impact of the fiber having multiple spatial modes at the pump wavelength.

13. The method of claim 11, wherein the interferometer paths have an asymmetric time delay, creating a frequency-dependent splitting ratio that is controlled by the pump.

14. The method of claim 11, further comprising a means of temporally pulsing the pump to define a temporal switching window, where the temporal switching window being scanned with respect to an arrival time of the input signal being an input signal pulse train in order to temporally localize the signal.

15. The method of claim 14, further comprising setting the temporal switching window to be narrower than a input signal pulse width, thus enabling a measurement of a input signal temporal pulse shape.

16. The method of claim 14, further comprising using a first longer switching window scanned over up to an entire input optical pulse period to coarsely determine a pulse train temporal location, then using a shorter switching widow scanned over up to the coarsely determined pulse train location, a use of different switching window durations allowing for the pulse train location to be determined both quickly and with high resolution.

17. The method of claim 14, whereas the interferometer paths have an asymmetric time delay, creating a frequency-dependent splitting ratio that is controlled by the pump-induced XPM.

* * * * *